United States Patent
Mamigonians

(10) Patent No.: US 10,928,348 B2
(45) Date of Patent: Feb. 23, 2021

(54) EXAMINING OBJECTS WITH ELECTRIC FIELDS

(71) Applicant: Zedsen Limited, London (GB)

(72) Inventor: Hrand Mami Mamigonians, London (GB)

(73) Assignee: Zedsen Limited, London (GB)

(*) Notice: Subject to any disclaimer, the term of this patent is extended or adjusted under 35 U.S.C. 154(b) by 112 days.

(21) Appl. No.: 16/203,745

(22) Filed: Nov. 29, 2018

(65) Prior Publication Data

US 2019/0195821 A1 Jun. 27, 2019

(30) Foreign Application Priority Data

Dec. 23, 2017 (GB) ..................................... 1722231

(51) Int. Cl.
*G01N 27/22* (2006.01)
(52) U.S. Cl.
CPC .......... *G01N 27/226* (2013.01); *G01N 27/22* (2013.01); *G01N 27/228* (2013.01)
(58) Field of Classification Search
CPC .............. G01N 27/226; G01N 27/228; G01N 27/22–228; G06F 3/0445
See application file for complete search history.

(56) References Cited

U.S. PATENT DOCUMENTS

| | | | | |
|---|---|---|---|---|
| 6,370,965 B1* | 4/2002 | Knapp | ............... | G06K 9/00053 73/780 |
| 2006/0119369 A1 | 6/2006 | Kawahata et al. | | |
| 2010/0098303 A1* | 4/2010 | Chen | ............... | G06K 9/0002 382/124 |
| 2010/0219845 A1* | 9/2010 | Easter | ............... | H03K 17/9622 324/678 |
| 2010/0321336 A1* | 12/2010 | Chou | ............... | G06F 3/0416 345/174 |
| 2011/0267293 A1* | 11/2011 | Noguchi | ............... | G06F 3/0416 345/173 |
| 2012/0223723 A1 | 9/2012 | Mamigonians | | |
| 2014/0292709 A1* | 10/2014 | Mizuhashi | ............... | G06F 3/044 345/174 |

(Continued)

FOREIGN PATENT DOCUMENTS

| | | |
|---|---|---|
| WO | 2013083952 A1 | 6/2013 |
| WO | 2014030129 A1 | 2/2014 |
| WO | 2017022258 A1 | 2/2017 |

OTHER PUBLICATIONS

Corresponding Great Britain Search Report, Application No. 1722231.6 dated Jun. 21, 2018, 1 page.

(Continued)

*Primary Examiner* — Patrick Assouad
*Assistant Examiner* — Demetrius R Pretlow
(74) *Attorney, Agent, or Firm* — Cooper Legal Group, LLC

(57) ABSTRACT

Objects are examined with electric fields to determine properties of the objects. An active-plane (300) is defined by active electrodes (301-308) mounted on a dielectric-membrane (309). A processor energizes a first active electrode during a coupling operation and monitors a second active electrode. A cooperating plane (310) is defined by cooperating electrodes (321-329). The cooperating plane is displaced from the active plane and the processor selects electrical attributes (grounded, floating etc.) for selected cooperating electrodes during each coupling operation.

20 Claims, 16 Drawing Sheets

(56) References Cited

U.S. PATENT DOCUMENTS

| | | | |
|---|---|---|---|
| 2015/0084006 A1* | 3/2015 | Ivanov | G06F 3/044 |
| | | | 257/40 |
| 2015/0138104 A1* | 5/2015 | Sugita | G06F 3/044 |
| | | | 345/173 |
| 2015/0378495 A1* | 12/2015 | Losh | G06F 3/044 |
| | | | 345/174 |
| 2017/0300166 A1* | 10/2017 | Rosenberg | G06F 3/0414 |
| 2018/0204036 A1* | 7/2018 | Akhavan Fomani | |
| | | | G06K 9/0002 |
| 2019/0147211 A1* | 5/2019 | Shu | G06K 9/0002 |
| | | | 382/124 |
| 2019/0187829 A1* | 6/2019 | Frame | G06F 3/044 |

OTHER PUBLICATIONS

Corresponding International Patent Application No. PCT/GB2018/000263, International Search Report, dated Feb. 22, 2019.
Cui, Z., et al., "Image Reconstruction for Field-Focusing Capacitance Imaging; Image Reconstruction for Field-Focusing Capacitance Imaging", Measurement Science and Technology, Feb. 15, 2011, pp. 1-9, vol. 22, No. 3.

* cited by examiner

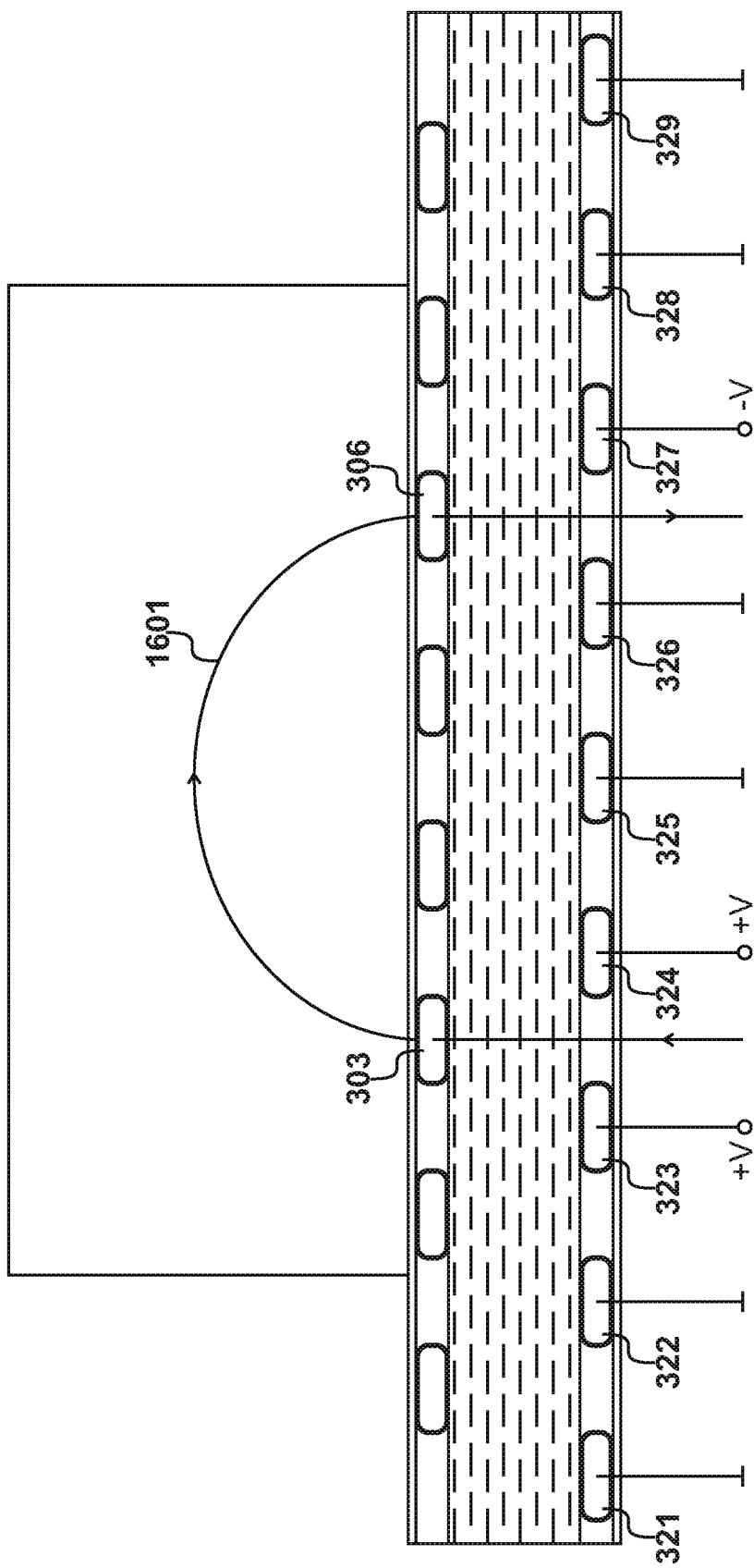

US 10,928,348 B2

EXAMINING OBJECTS WITH ELECTRIC FIELDS

CROSS REFERENCE TO RELATED APPLICATIONS

This application claims priority from United Kingdom Patent Application number 1722231.6, filed on Dec. 23, 2017, the whole contents of which are incorporated herein by reference.

BACKGROUND OF THE INVENTION

The present invention relates to an apparatus for examining objects with electric fields to determine properties of said objects. The present invention also relates to a method of examining objects with electric fields to determine characteristics of said objects.

It is known to examine objects with electric fields, as disclosed in U.S. Pat. No. 8,994,383, assigned to the present applicant. A first surface is provided to receive objects, given that it is undesirable to create an airgap between the object to be examined and a scanning surface. It is known to include a ground-plane in examination apparatus of the aforesaid type, to reduce the presence of noise in an output signal. However, the presence of a ground plane also results in a proportion of the output signal being lost. A problem therefore exists in terms of increasing signal strength while avoiding the introduction of noise.

SUMMARY OF THE INVENTION

According to a first aspect of the invention, there is provided an apparatus for examining objects using electric fields to determine properties of said objects, comprising: an active plane of active electrodes mounted on a dielectric membrane; a processor configured to energize a first of said active electrodes during a coupling operation, and monitor a second of said active electrodes during said coupling operation, such that electric fields penetrate said objects and are influenced by properties of said objects; and a cooperating plane of cooperating electrodes, wherein: said cooperating plane is displaced from said active plane; and said processor is further configured to select an electrical attribute for a cooperating electrode during said coupling operation.

In an embodiment, the processor is configured to select said electrical attribute from a list including: grounding, floating and energising.

In an embodiment, a spacer material is positioned between said active plane and said cooperating plane.

In an embodiment, the active electrodes define substantially parallel tracks on said active plane, with a gap between each of said tracks. The cooperating electrodes may define substantially parallel tracks on said cooperating plane; and each cooperating electrode may be substantially opposite a respective one of said gaps.

According to a second aspect of the present invention, there is provided a method of examining objects using electric fields to determine properties of said objects, comprising the steps of: energising a first active electrode of an active plane during a coupling operation; monitoring a second active electrode of said active plane during said coupling, in response to electric fields that penetrate said object; and selecting electrical attributes for cooperating electrodes of a cooperating plane, wherein: said cooperating plane is displaced from said active plane; and said electrical attributes are selected from a list including grounding, floating and energising.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

BRIEF DESCRIPTION OF THE SEVERAL VIEWS OF THE DRAWINGS

FIG. 16 shows a configuration of electrodes according to a fourth embodiment.

DETAILED DESCRIPTION OF EMBODIMENTS OF THE INVENTION

FIG. 1

Figure 1:
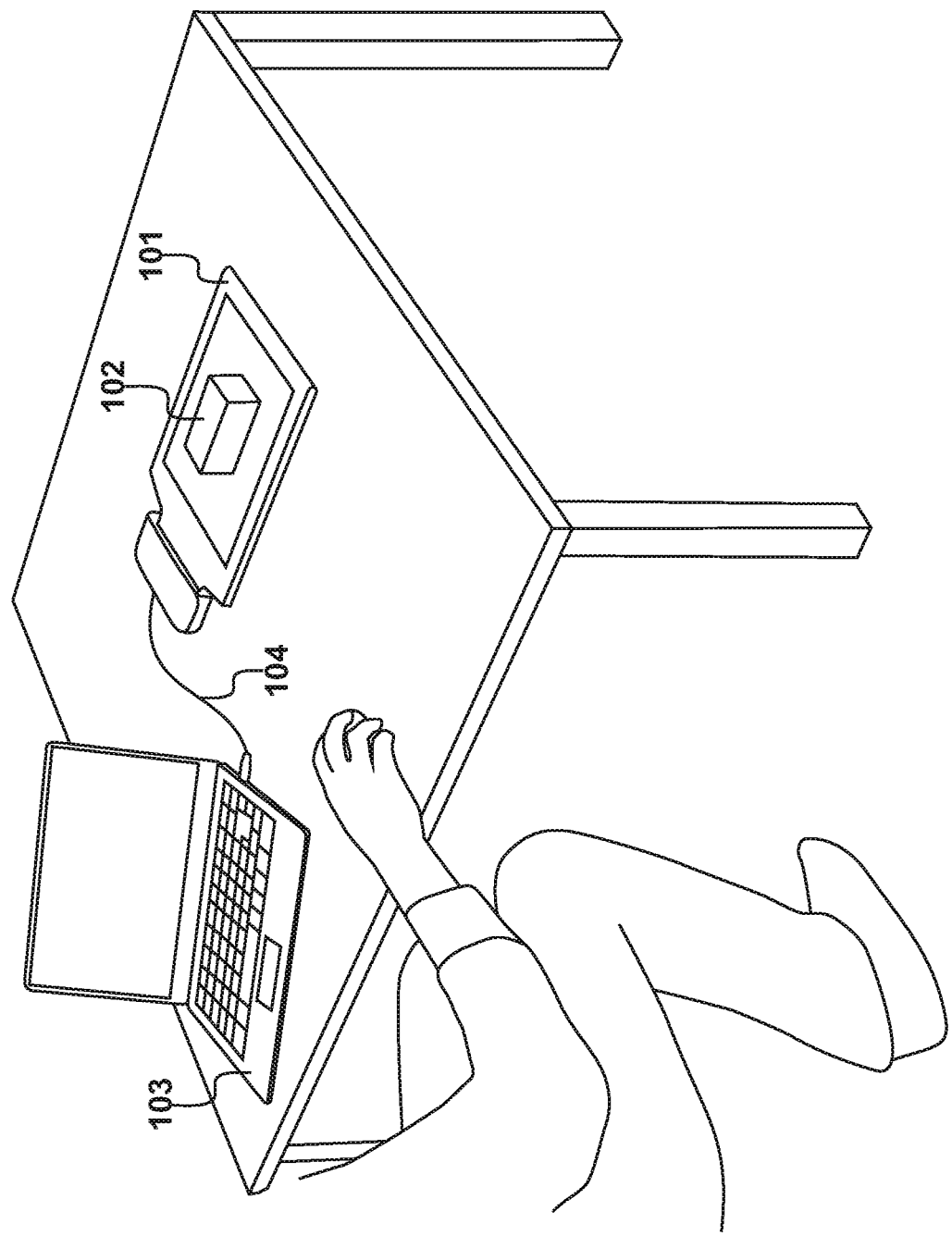
FIG. 1 shows an examination apparatus.

An examination apparatus 101 is shown in FIG. 1, for examining electrical properties of objects such as an object 102, using electric fields. The examination apparatus 101 communicates with a data-processing system 103 via a data-communication cable 104, possibly designed in accordance with established USB protocols.

In an alternative embodiment, wireless communication is provided between the examination apparatus 101 and the data-processing system 103.

FIG. 2

Figure 2:
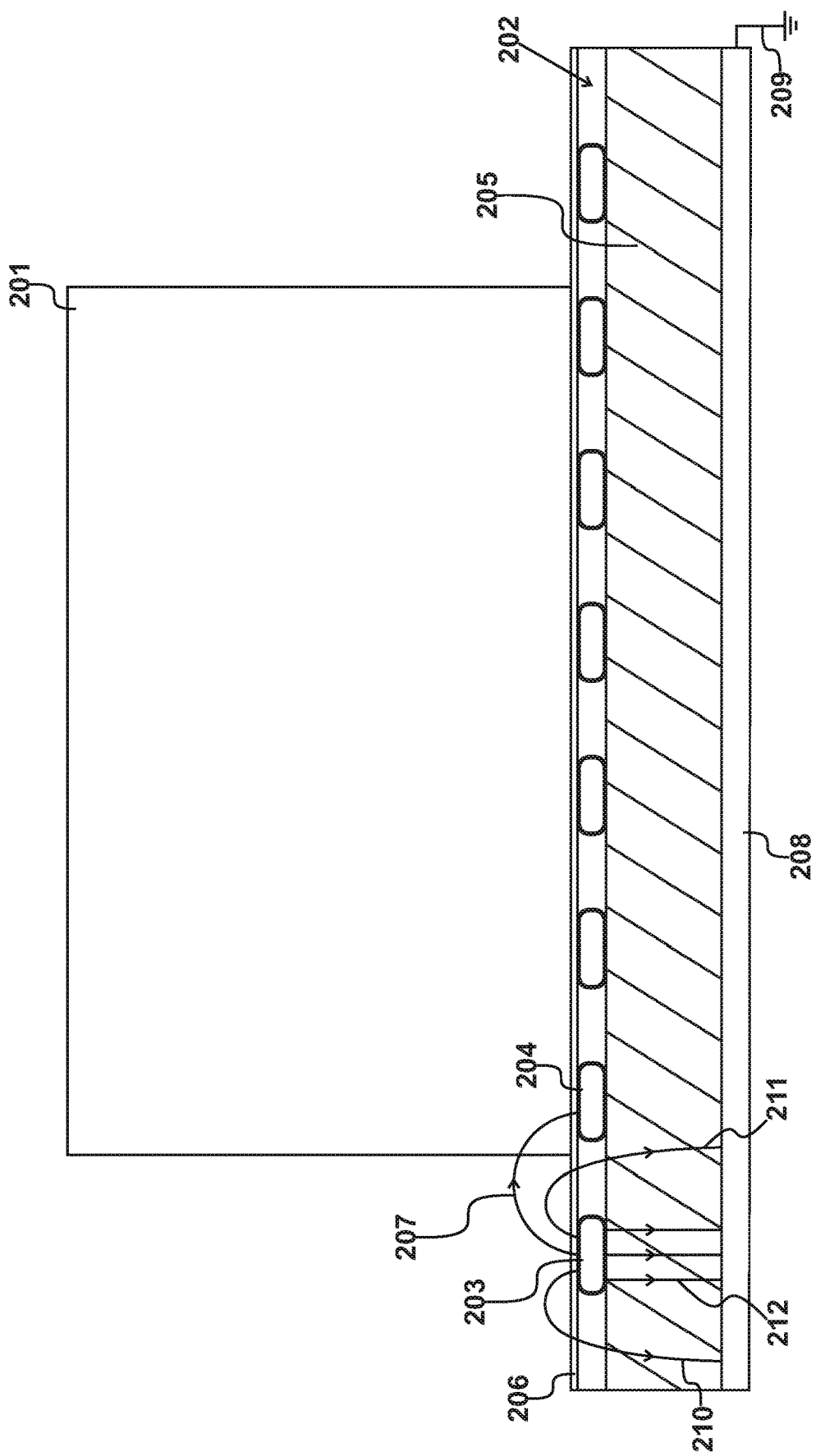
FIG. 2 shows a cross-section of a known examination apparatus.

A cross-section of a known examination apparatus is shown in FIG. 2, in which an object 201 is examined using electric fields to determine properties of the object. The apparatus includes an active plane 202 on which active electrodes 203, 204 etc. are mounted on a dielectric membrane 205. This is in turn covered with a thin insulating layer 206 to electrically insulate the electrodes 203, 204 from the object 201. In use, a processor is configured to energize a first of the active electrodes (203) during a coupling operation and monitor a second of said active electrodes (204) during this coupling operation; in which the energized transmitter electrode and the monitored receiver electrode are capacitively coupled. Thus, when an electrode, such as active electrode 204, is monitored, it creates an electric field 207 by being capacitively coupled to the energized electrode 203. An analog signal is received at the monitored electrode 204, which is sampled to produce digital data.

The monitored electrode 204 is sensitive to electrical noise received from external sources. To reduce the presence of this induced electrical noise, the active electrodes 203, 204 are shielded by a ground plane 208, connected to ground, as illustrated at 209. However, during the energisation of the first electrode 203, part of the electric field will be attracted to the ground plane 207, as illustrated by field 210 and field 211. In addition, leakage also occurs from the energized electrode directly to ground, as indicated by a leakage field 212.

FIG. 3

Figure 3:
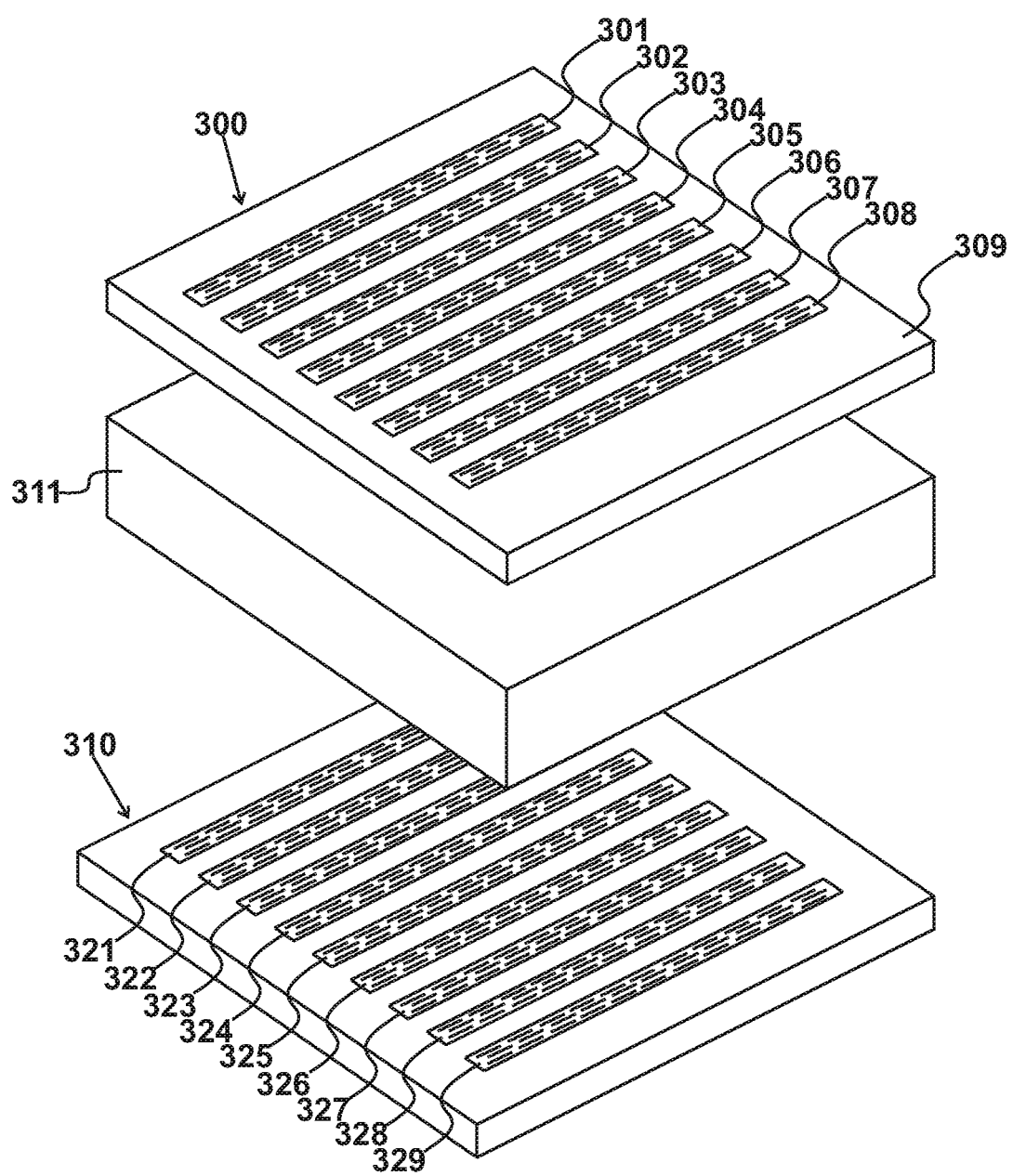
FIG. 3 shows an exploded view of an examination apparatus embodying an aspect of the present invention.
Figure 4:
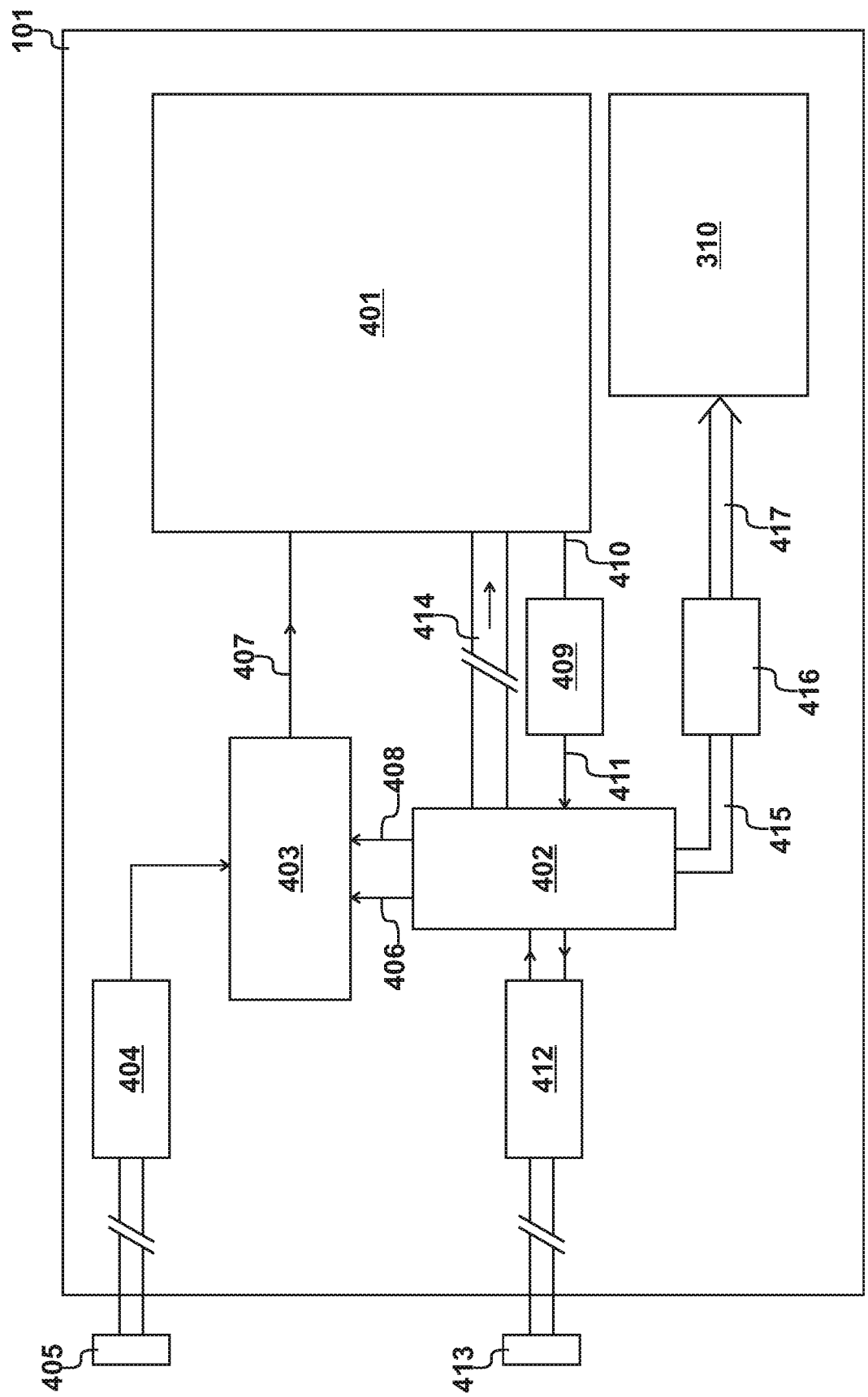
FIG. 4 shows a block diagram of the workings of the examination apparatus identified in FIG. 1.

An exploded view of the examination apparatus 101 embodying the present invention is illustrated in FIG. 3. The apparatus includes an active plane 300 of active electrodes, including a first-active electrode 301, a second-active electrode 302, a third-active electrode 303, a fourth-active electrode 304, a fifth-active electrode 305, a sixth-active electrode 306, a seventh-active electrode 307 and an eighth-active electrode 308. A processor, described with reference to FIG. 4, is configured to energize a first of the active electrodes during a coupling operation and monitor a second of the active electrodes during this operation. The electrodes are mounted on a dielectric membrane 309 that also includes an insulating material. However, instead of being provided with a ground plane, similar to ground plane 207 described with reference to FIG. 2, the examination apparatus 101 has a cooperating plane 310 that is displaced from the active plane 300 by a spacer material 311.

The cooperating plane 310 has cooperating electrodes including a first-cooperating electrode 321, a second-cooperating electrode 322, a third-cooperating electrode 323, a fourth-cooperating electrode 324, a fifth-cooperating electrode 325, a sixth-cooperating electrode 326, a seventh-cooperating electrode 327, an eighth-cooperating electrode 328 and a ninth-cooperating electrode 329. In operation, a processor selects an electrical attribute for cooperating electrodes in the cooperating plane 310 during each coupling operation, during which a first active electrode is energized and a second active electrode is monitored. In an embodiment a cooperating electrode may be grounded, left floating or energized.

FIG. 4

A block diagram of the workings of the examination apparatus 101 is illustrated in FIG. 4. In FIG. 4, the dielectric membrane 202, with the group 201 of parallel electrodes, is included within a multiplexing environment 401. In addition to the dielectric membrane 202, the multiplexing environment 401 also includes a de-multiplexer for selectively de-multiplexing energizing input pulses, along with a multiplexer for selecting output signals.

A processor 402, implemented as a microcontroller in an embodiment, controls the de-multiplexer and the multiplexer to ensure that the same electrode cannot both be energized and monitored during the same coupling operation. An energizing circuit 403 is energized by a power supply 404 that in turn may receive power from an external source via a power-input connector 405. A voltage-control line 406, from the processor 402 to the energizing circuit 403, allows the processor 402 to control the voltage (and hence the energy) of energizing signals supplied to the multiplexing environment 401 via a strobing line 407. The timing of each strobing signal is controlled by the processor 402 via a trigger-signal line 408.

An output from the multiplexing environment 401 is supplied to an analog processing circuit 409 over a first analog line 410. A conditioning operation is performed, by the analog processing circuit 409, allowing analog output signals to be supplied to the microcontroller via a second analog line 411. The processor 402 also communicates with a two-way data-communication circuit 412, thereby allowing a data interface 413 to connect with the data-communication cable 103.

In operation, the processor 402 supplies addresses over address busses 414 to the multiplexing environment 401, to achieve the required functionality. Thus, having supplied addresses to the multiplexing environment 401, an energizing voltage is supplied via strobing line 407, resulting in an output signal being supplied to the processor 402 as part of a complete coupling operation. At the processor 402, a monitored analog signal is sampled to produce a digital representation that may be stored locally or uploaded to the data-processing system 102 via the data interface 414.

In an embodiment, the processor 402 also includes input/output ports that supply control data on control lines 415 to respective cooperating electrodes within the cooperating plane 310. Thus, under program control, any of these control lines can be grounded, left floating or energized.

The processor 402 supplies cooperating addresses on a cooperating address bus 415 to a cooperating control circuit 416. The cooperating control circuit supplies attribute control signals to respective cooperating electrodes of the cooperating plane 310, via cooperating attribute lines 417. Details of the cooperating control circuit are described with reference to FIG. 12.

FIG. 5

Figure 5:
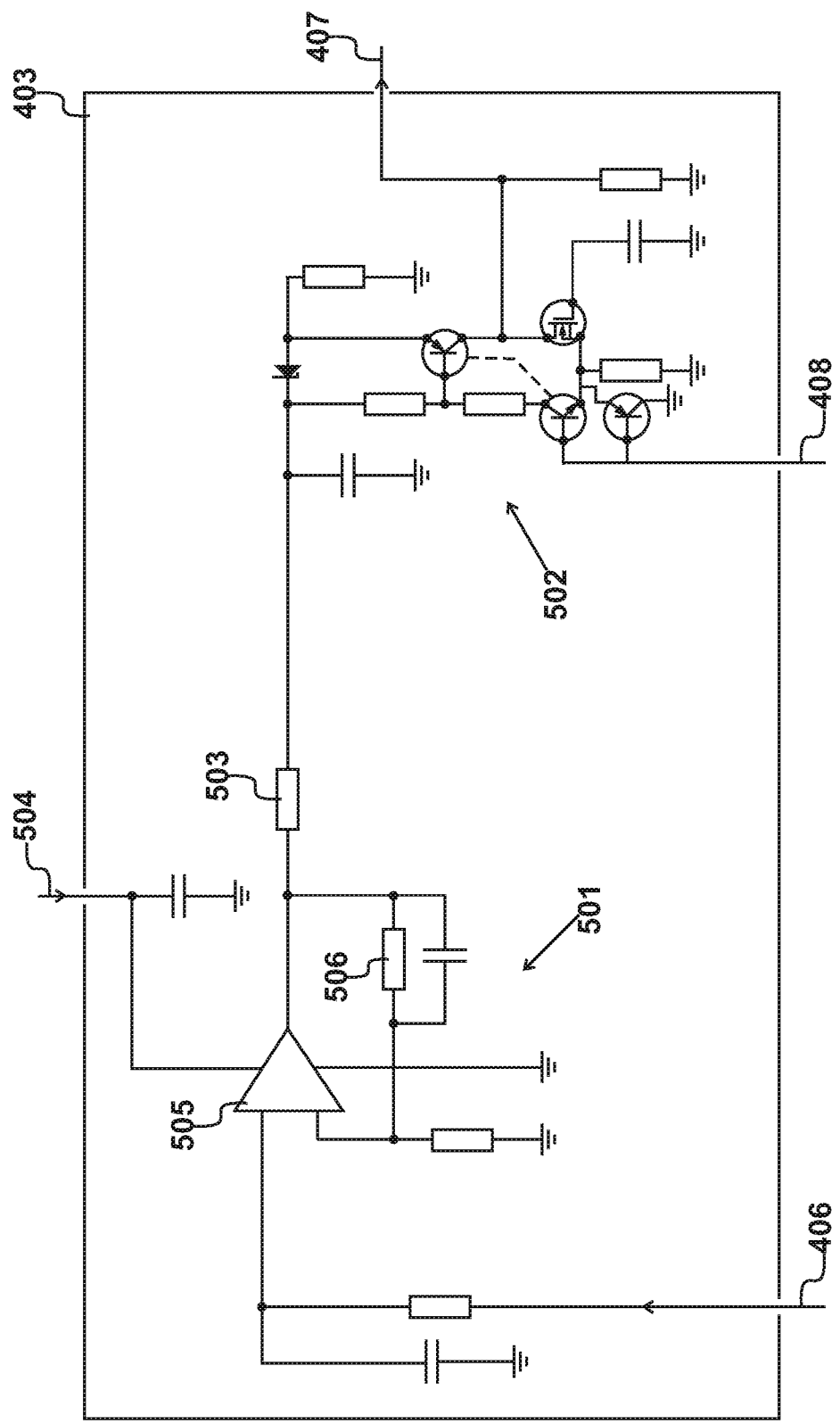
FIG. 5 shows a schematic representation of the energizing circuit identified in FIG. 4.

A schematic representation of the energizing circuit 403 is shown in FIG. 5. The energising circuit 403 includes a voltage control circuit 501 connected to a strobing circuit 502 via a current-limiting resistor 503.

A voltage input line 504 receives energizing power from the power supply 404 to energize an operational amplifier 505. The operational amplifier 505 is configured as a comparator and receives a reference voltage via a feedback resistor 506. This is compared against a voltage control signal received on the voltage-control line 406, to produce an input voltage for the strobing circuit 502.

In the embodiment of FIG. 5, the strobing circuit 502 includes two bipolar transistors configured as a Darlington pair, in combination with a MOSFET. This creates strobing pulses with sharp rising edges and sharp falling edges, that are conveyed to the strobing line 407, after receiving a triggering signal on the trigger-signal line 408.

FIG. 6

Figure 6:
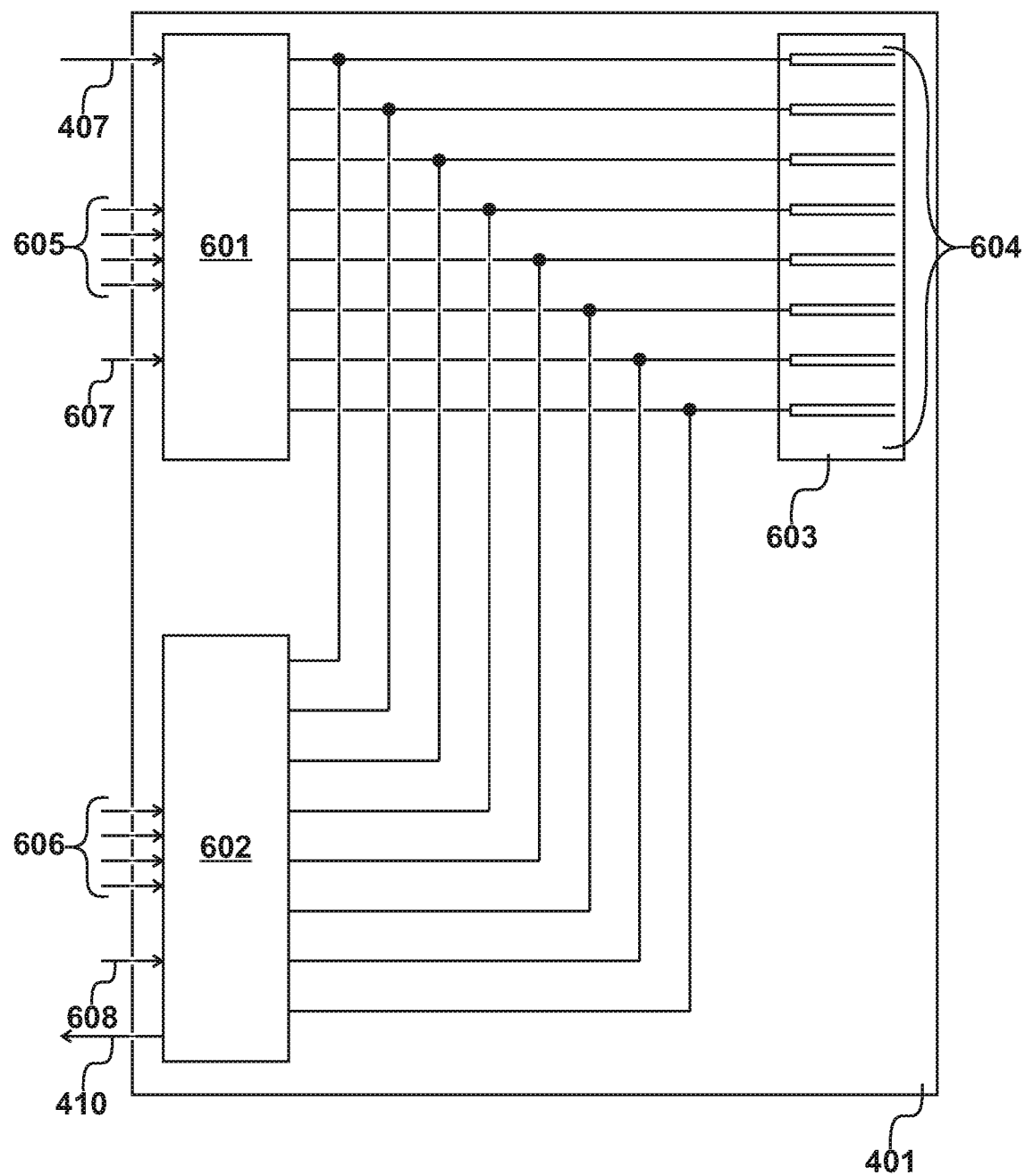
FIG. 6 shows an example of the multiplexing environment identified in FIG. 4.

An example of the multiplexing environment 401 is detailed in FIG. 6, in which a first-multiplexing device 601 supplies energizing input pulses to active electrodes. In each coupling operation, a second multiplexing device 602 monitors analog output signals.

The address busses 414 include an input address bus 605, and an output address bus 606, for addressing the first multiplexing device 601 and the second multiplexing device 602 respectively. The addressing space for the input address bus 605 and the addressing space for the output address bus 606 may be similar, which may assist in terms of ensuring that the same address cannot be supplied simultaneously to both the input address bus 605 and the output address bus 606.

The first multiplexing device 601 also includes a first enabling line 607. Similarly, the second multiplexing device 407 includes a second enabling line 608. In operation, addresses are supplied to the input address bus 605 and to the output address bus 606 but line selection does not actually occur until the multiplexing devices receive a respective enabling signal.

The first multiplexing device 601 receives an input pulse from the energizing circuit 403 via the strobing line 407. Multiple strobing operations are performed, such that an input energizing voltage is supplied to electrodes performing a transmitter function. Strobing signals are distributed to multiple inputs; therefore, the first multiplexing device 601 should be seen as performing a de-multiplexing operation.

The second multiplexing device 602 performs a multiplexing operation, in that multiple output signals are selected sequentially and then combined onto the first analog line 410 for reception by the monitoring circuit 409. Thus, in this embodiment, the multiplexing environment is established by a single first multiplexing device for input signals and a single second multiplexing device for output signals, both of which are connected to all eight of the available active electrodes. If a greater number of electrodes are present upon a dielectric membrane, it is possible for additional multiplexing devices to be provided such that, for example, a pair of multiplexing devices may provide the input de-multiplexing function and a further pair of multiplexing devices may provide the multiplexing output function.

During a coupling operation, an input address is supplied on the input address bus 605 and an output address is supplied on the output address bus 606. The addresses are enabled such that, at a particular point in time, the output multiplexer 602 is enabled and is therefore configured to monitor output signals on the addressed output electrodes. The selected input electrode is then energized by the application of a strobing pulse.

A predetermined delay occurs before a sample of the voltage monitored on the output electrode is taken at a sampling instant. The analog voltage is conditioned by the analog processing circuit 409, which in turn supplies a conditioned voltage to the microcontroller 402 via the second monitoring line 411. Digital-to-analog conversion then takes place within the microcontroller 402, such that the point at which the sampling instant occurs is determined by the microcontroller.

FIG. 7

Figure 7:
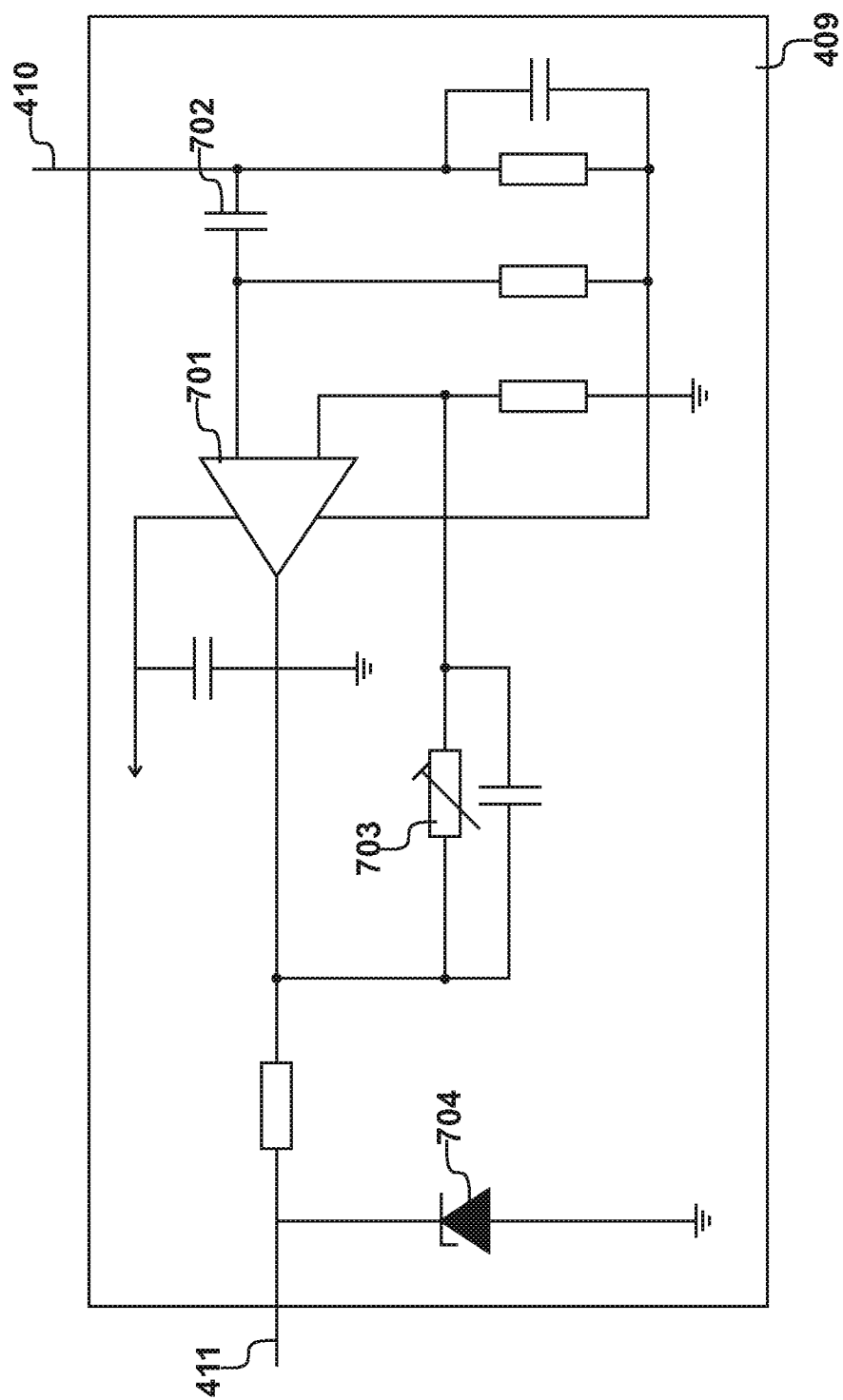
FIG. 7 shows the analog processing circuit identified in FIG. 4.

An example of an analog processing circuit 409 is illustrated in FIG. 7. Signals received on the first analog line 410 are supplied to a buffering amplifier 701 via a decoupling capacitor 702. During an initial set up procedure, a variable feedback resistor 703 is trimmed to optimise the level of monitored signals supplied to the processor 402 via the second monitoring line 411. A Zener diode 704 prevents excessive voltages being supplied to the processor 402.

FIG. 8

Figure 8:
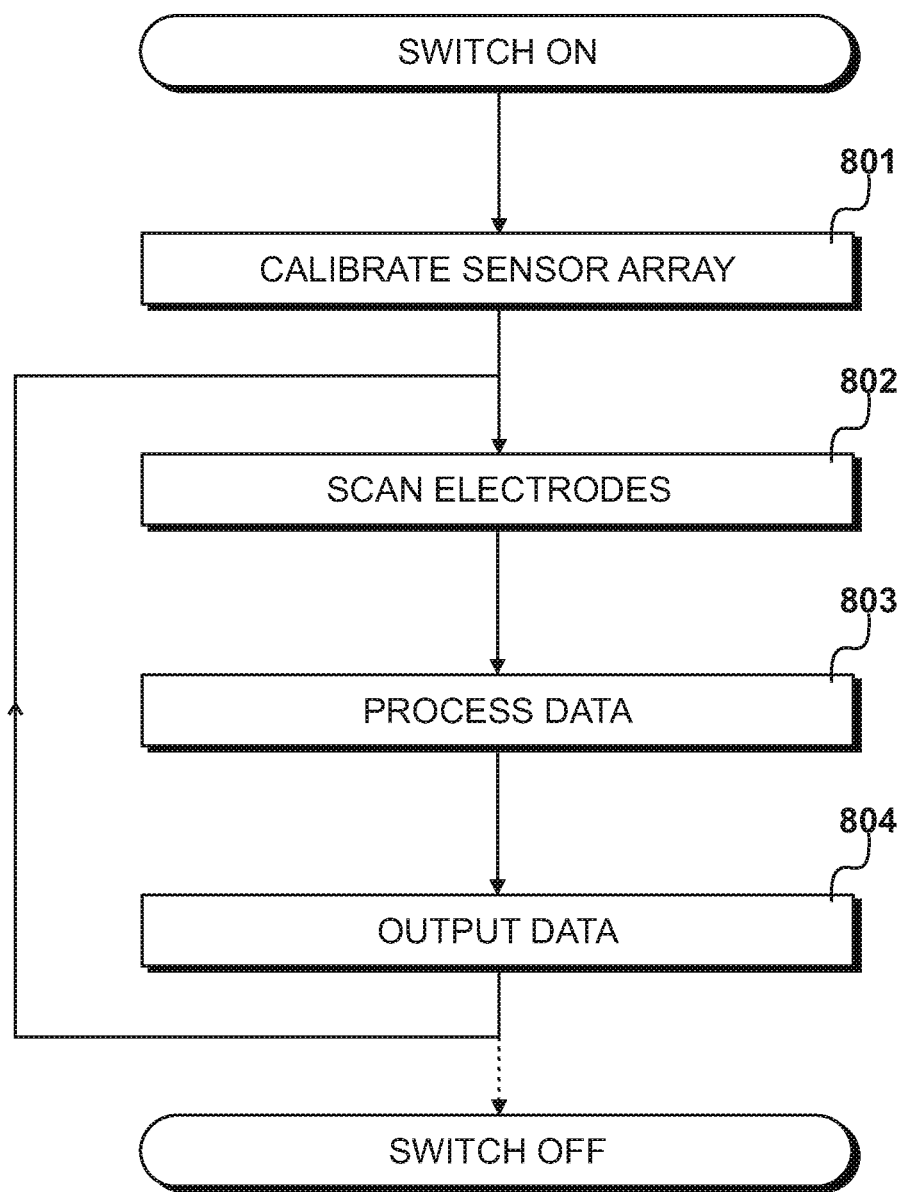
FIG. 8 illustrates procedures performed by the processor identified in FIG. 4.

Procedures performed by the processor 402 are illustrated in FIG. 8. After an initial switch on, possibly initiated by the data-processing system 102, the examination apparatus is calibrated at step 801. This enables a reference level to be established, prior to the application of an object.

After the application of an object, the electrodes are scanned at step 802. Each scan consists of a plurality of coupling operations, with each coupling operation engaging a unique combination of transmitter electrode and receiver electrode.

At step 803, data is processed and the degree of local data processing will depend upon the processing capabilities provided by the processor 402. In an embodiment, the level of received monitored signals may be compared against a reference and, where appropriate, a control voltage on the voltage-control line 406 may be adjusted. Furthermore, in an embodiment, the control voltage may be adjusted when deeper penetration is required.

A more sophisticated level of processing may be achieved by the data-processing system 102, therefore output data is supplied to the data-processing system 102 at step 804. Thereafter, further scanning is performed at step 802 and the procedures are repeated until the device is switched off.

FIG. 9

Figure 9:
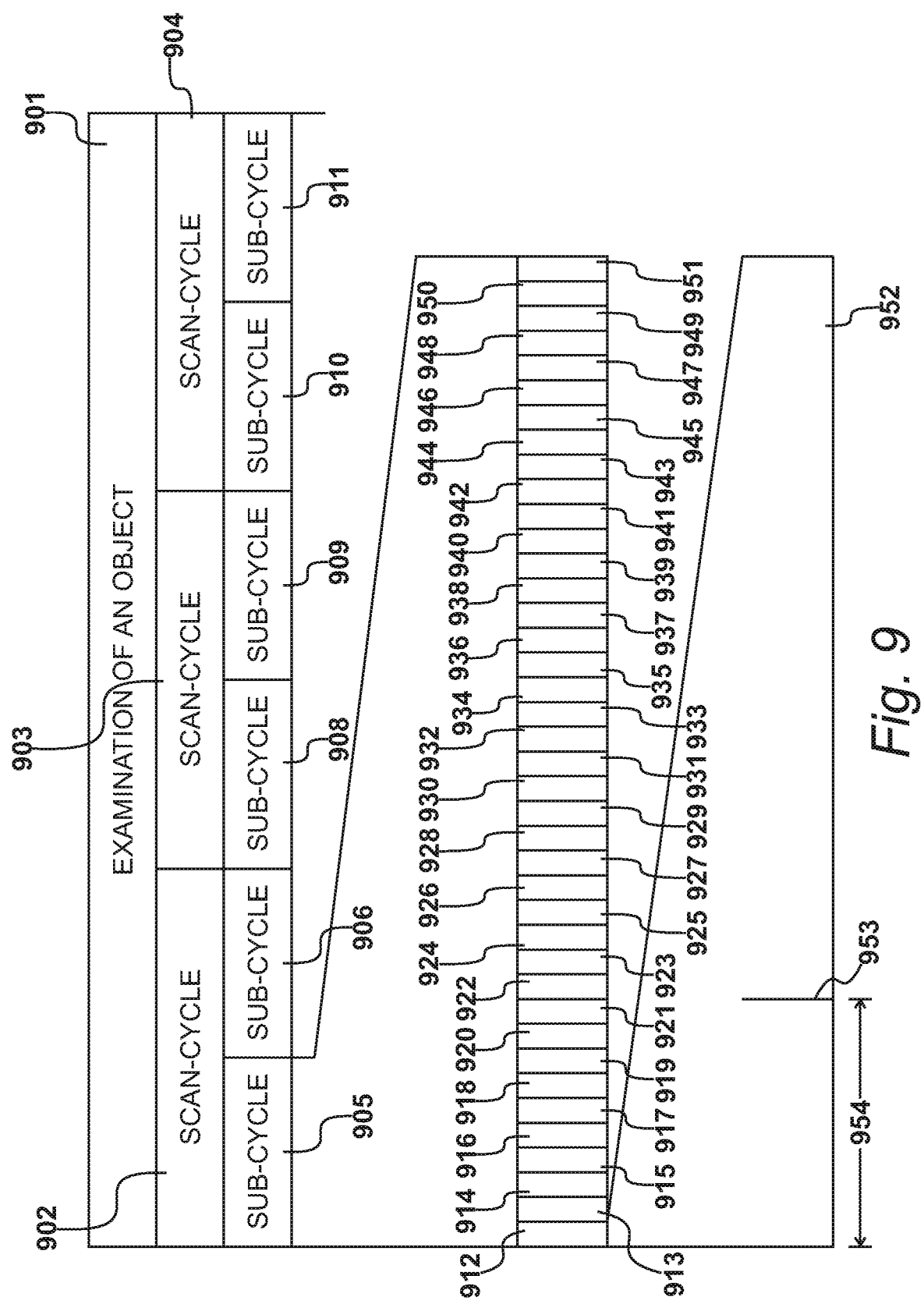
FIG. 9 shows an example of a working period.

During a working period, many objects may be examined. The duration of an individual examination is illustrated in FIG. 9 and similar procedures are performed for each object. An examination for a particular object starts by arranging the object on the apparatus, as described with reference to FIG. 1.

During an examination process 901, transmitter electrodes are energized and receiver electrodes are monitored. Such a procedure may be referred to informally as scanning. As used herein, a complete scan cycle is performed when all unique combinations of transmitters and receivers have been exercised. Thus, during examination process 901, many scan-cycles may be performed. For the purposes of this illustration, during examination process 901, a first-scan cycle 902 is performed, followed by a similar second scan cycle 903 and a similar third scan cycle 904.

A particular scan cycle may be represented as a particular unique pattern of energizing and monitoring operations. In an embodiment, a scan cycle is not completed until all of the available electrodes have been energized and all of the available electrodes have been monitored. However, such a procedure may take a significant amount of time and in alternative embodiments, selected electrodes are energized and selected electrodes are monitored, in an attempt to optimize the level of data received while minimising the number of strobing operations required. In this way, it is possible to repeat the scan cycle more times during the examination of an object and, in some circumstances, make changes to other operating conditions; again, with a view to optimising the quality of the data received.

In an embodiment, it is also possible to identify a particular scanning pattern that may be repeated at different positions within the array of available electrodes. In an embodiment, the array may be divided; with a similar scanning pattern being deployed upon each divided section.

In the embodiment of FIG. 3, eight electrodes are available and a complete scan cycle may involve all of these electrodes, whereafter a similar pattern is repeated for the next scan cycle. In an alternative embodiment sixteen electrodes may be available and a similar scanning operation could be performed with reference to all sixteen electrodes before the scan cycle is repeated. However, as an alternative approach, it is possible to divide the sixteen-electrode array into two sets of eight electrodes. The first set undergoes a scan cycle, whereafter the second set undergoes a similar scan-cycle. A complete scan cycle therefore involves performing operations with the first set followed by similar operations on the second set. Consequently, it is possible to identify the first set of scanning operations as being within a first-sub-cycle 905, with the second set of operations falling within a second sub-cycle 906. Thus, scan cycle 902 now comprises sub-cycle 905 and sub-cycle 906.

Similarly, the second scan cycle 903 is made up of a third sub-cycle 908 followed a fourth sub-cycle 909. Thereafter, the third scan cycle 904 is implemented by a fifth sub-cycle 910 followed by a sixth sub-cycle 911.

Each sub-cycle 904 to 911 involves a similar set of strobing operations, representing a similar coupling pattern performed upon the selected set of electrodes. These may consist of a first coupling operation 912, followed by a second coupling operation 913, followed by a third coupling operation 914, followed by a fifth coupling operation and so on, until the fortieth coupling operation 951 in this example. Thereafter, similar coupling operations are performed for the next sub-cycle 906. However, the particular number of coupling operations performed within each sub-cycle will vary, depending upon the number of active electrodes present within the group and the particular coupling pattern deployed to efficiently derive the required data.

Each coupling operation within a sub-cycle is unique, in terms of the particular electrode selected as the transmitter in combination with the particular electrode selected as the receiver. Each coupling operation consists of energizing the selected transmitter electrode and monitoring the selected receiver electrode.

Due to capacitive coupling, each monitoring process monitors a voltage at the receiver electrode. To determine electrical properties of objects, a measurement is required. In an embodiment, this measurement is achieved by performing a process of analog-to-digital-conversion, thereby allowing the result of the conversion to be processed within the digital domain.

As illustrated in FIG. 9, a coupling operation, such as the first coupling operation 912, takes place within a monitored duration 952. Within the monitored duration 952, a sampling instant 953 occurs, representing an instant within the monitored duration 952 at which an output voltage is sampled.

In order to optimize results received from the examination process, the sampling instant 953 does not occur immediately following the generation of an input strobing signal. Although, in an embodiment, a sharp, rapidly rising strobing input signal is supplied to the transmitter electrodes, the shape of the resulting output signals will not rise so steeply; as a result of the electrical properties of the device and the electrical properties of the objects being examined. Thus, to optimize the value of the information derived from the procedure, the sampling instant 953 is delayed by a predetermined delay period 954.

FIG. 10

Figure 10:
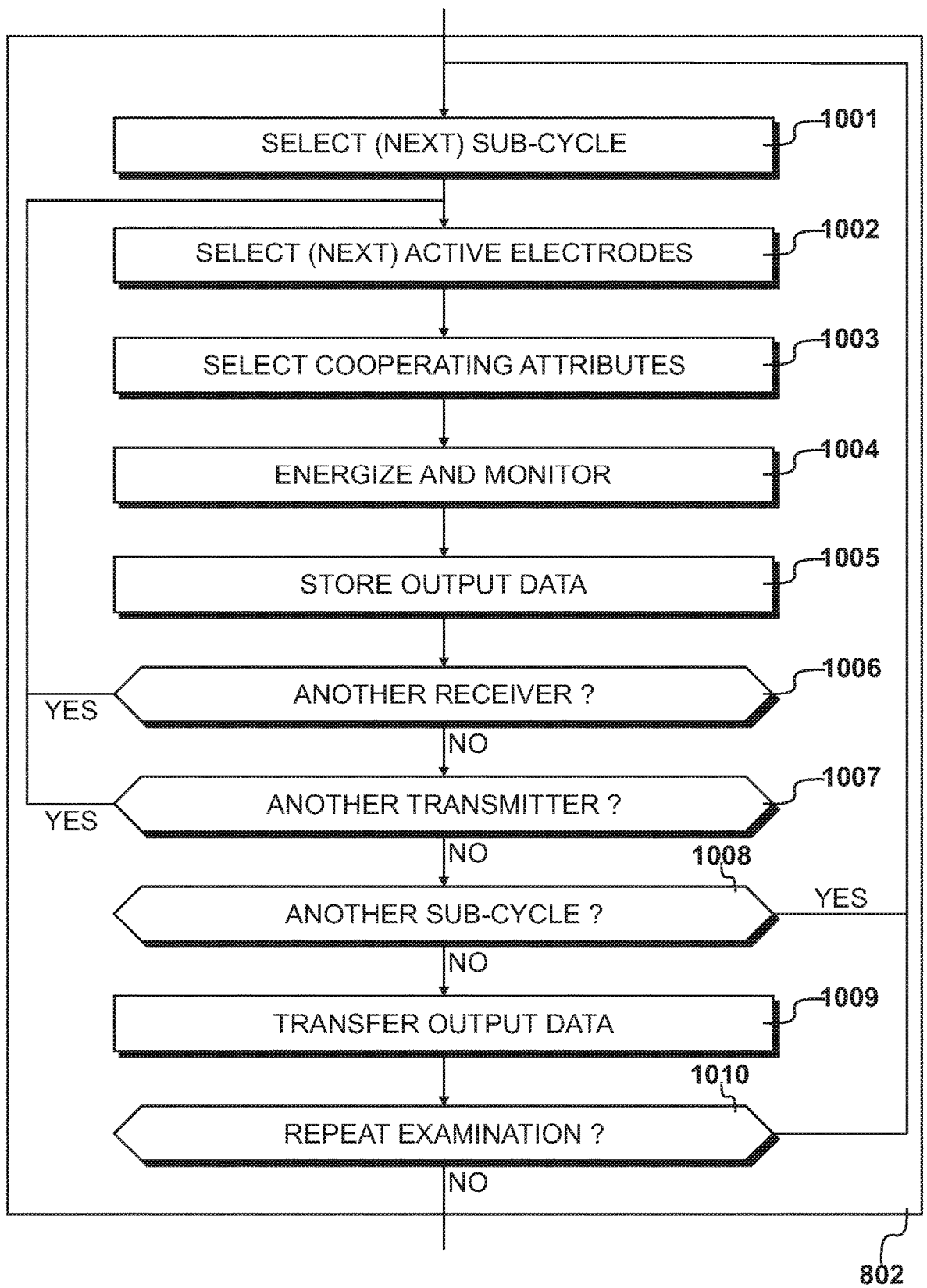
FIG. 10 details procedures performed by the processor shown in FIG. 4 during the examination identified in FIG. 8.

Procedures 802 performed by processor 402 during a scan cycle 902 are illustrated in FIG. 10. At step 1001, a sub-cycle is selected which, on a first iteration, would be the first-sub-cycle 905. As described with reference to FIG. 9, coupling operations are performed, starting with the first coupling operation 912. Thus, at step 1002 active electrodes are selected, consisting of a transmitter electrode and a receiver electrode.

Thereafter, in accordance with an embodiment of the present invention, electrical attributes for the cooperating electrodes (321 to 329) are selected at step 1003. In particular, in an embodiment, a selection is made for each cooperating electrode, such that its electrical attribute may be identified as grounded, floating or energized. The selected transmitter is then energized at step 1004 and the selected receiver is monitored. Output data is then stored at step 1005, thereby completing the coupling operation.

In an embodiment, a layering procedure is performed by selecting a transmitter and then, following a plurality of energizations upon the selected transmitter, performing a plurality of monitoring functions against a selection of receivers. As the selected receiver moves further away from the transmitter, the distance between the energized electrode and the monitored electrode increases, therefore the average depth of penetration also increases.

Thus, if the question asked at step 1006 is answered in the affirmative, to the effect that another receiver is to be deployed, the next receiver is selected at step 1002 and a further energisation occurs at step 1004. These procedures repeat until the question asked at step 1006 is answered in the negative, confirming that all of the receivers have been considered.

Each time a different receiver is selected at step 1002, appropriate modifications may be made to the selection of cooperating attributes at step 1003; even when the selected transmitter does not change from the previous iteration.

At step 1007, a question is asked as to whether another transmitter is to be energized within the sub-cycle and when answered in the affirmative, the next transmitter is selected at step 1002. Thereafter, the next receiver is selected, cooperating attributes are selected at step 1003 and an energization is performed at step 1004. Thus, for the second selected transmitter, a plurality of receivers may be selected; with each selection having appropriate attributes selected for the cooperating electrodes.

Eventually, all of the transmitters will have been considered and the question asked at step 1007 will be answered in the negative. A question is then asked at step 1008 as to whether a further sub-cycle is to be performed and when answered in the affirmative, the next sub-cycle is selected at step 1001. Thus, having completed the first-sub-cycle 905, the second-sub-cycle 906 is selected at step 1001.

Thus, upon selecting a different transmitter, at step 1002, alternative attributes for the cooperating electrodes are selected at step 1003. Thus, changes to the attributes of the cooperating electrodes occurs at a rate that is consistent with changes being made to the selection of the transmitter electrode and the receiver electrode within the active plane 300.

Procedures performed for the second sub-cycle 906 are similar to those performed for the first sub-cycle 905. However, an offset occurs in terms of the particular electrodes selected, such that the first sub-cycle 905 may engage a first set of electrodes, with the second sub-cycle 906 selecting a second set of electrodes. The complete scan cycle 902 is only completed when the first set (for the first-sub-cycle 905) and the second set (for the second-sub-cycle 906) have been considered. Thereafter, the whole process is repeated during the second scan cycle 903.

FIG. 11

Figure 11:
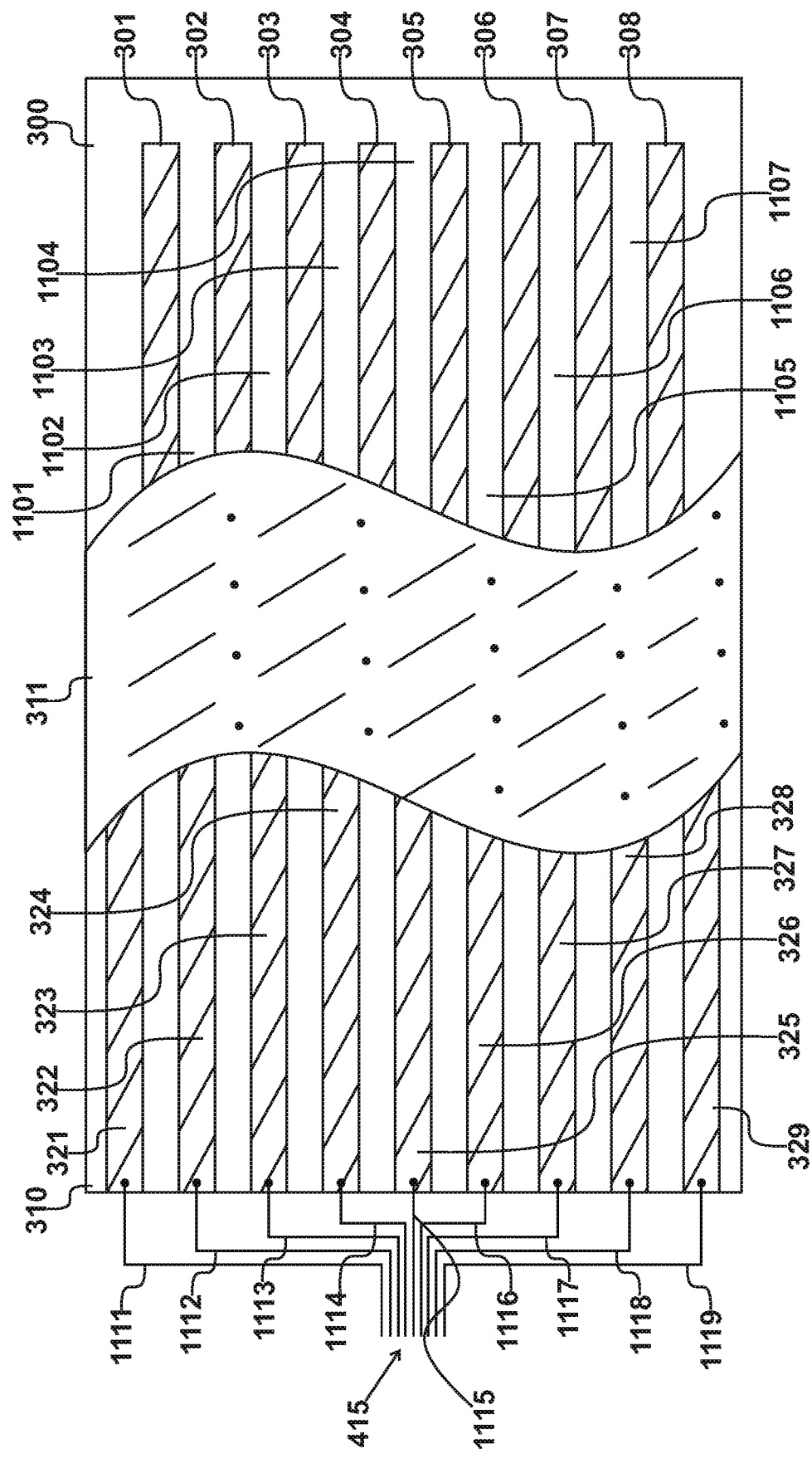
FIG. 11 shows a cut away view of the examination apparatus.

A cut-away view of the examination apparatus 101 is shown in FIG. 11, showing the active plane 300, the cooperating plane 310 and the spacer material 311 positioned between the active plane 300 and the cooperating plane 310. The active electrodes 301 to 308 define substantially parallel tracks on the active plane 300, with a gap between each of the tracks. Thus, a first gap 1101 is present between the first active electrode 301 and the second active electrode 302. A second gap 1102 is present between the second active electrode 302 and the third active electrode 303. A third gap 1103 is present between the third active electrode 303 and the fourth active electrode 304. A fourth gap 1104 is present between the fourth active electrode 304 and the fifth active electrode 305. A fifth gap 1105 is present between the fifth active electrode 305 and the sixth active electrode 306. A sixth gap 1106 is present between the sixth active electrode 306 and the seventh active electrode 307. A seventh gap 1107 is present between the seventh active electrode 307 and the eighth active electrode 308.

In an embodiment, the cooperating electrodes 321 to 329 define substantially parallel tracks on the cooperating plane 310. Furthermore, in an embodiment, each cooperating electrode is substantially opposite a respective one of gaps 1101 to 1107. Thus, in the embodiment of FIG. 11, the second cooperating electrode 322 is opposite the first gap 1101. The third cooperating electrode 323 is opposite the second gap 1102. The fourth cooperating electrode 324 is opposite the third gap 1103. The fifth cooperating electrode 325 is opposite the fourth gap 1104. The sixth cooperating electrode 326 is opposite the fifth gap 1105. The seventh cooperating electrode 327 is opposite the sixth gap 1106 and the eighth cooperating electrode 328 is opposite the seventh gap 1107. In addition, to provide further shielding from noise, the first cooperating electrode 321 is positioned to the outside of the first active electrode 301. Similarly, the ninth cooperating electrode 329 is positioned to the outside of the eighth active electrode 308. In an embodiment, further shielding may be provided on the active plane 300.

Control lines 415 consist of a first control line 1111 connected to the first cooperating electrode 321. A second control line 1112 is connected to the second cooperating electrode 322 and a third control line 1113 is connected to the third cooperating electrode 323. The fourth cooperating electrode 324 is connected to a fourth control line 1114, with a fifth control line 1115 being connected to the fifth cooperating electrode 325. A sixth control line 1116 is connected to the sixth cooperating electrode 326 and a seventh control line 1117 is connected to the seventh cooperating electrode 327. An eighth control line 1118 is connected to the eighth cooperating electrode 328 and a ninth control line 1119 is connected to the ninth cooperating electrode 329.

In the example shown in FIG. 11, eight active electrodes are provided, with an appropriate number of cooperating electrodes, such that each gap between active electrodes is adjacent to one of the cooperating electrodes, with additional cooperating electrodes at the ends. Thus, in this embodiment, with n active electrodes, there are n+1 cooperating electrodes. However, it should be appreciated that in other embodiments, the number of active electrodes may be increased, with an appropriate increase in the number of cooperating electrodes, to provide an examination apparatus with the required size and spatial resolution. In the embodiment of FIG. 11, the cooperating electrodes are shown positioned adjacent to gaps between active electrodes. However, in other embodiments, alternative arrangements may be made, such that the cooperating electrodes may align with the active electrodes.

FIG. 12

Figure 12:
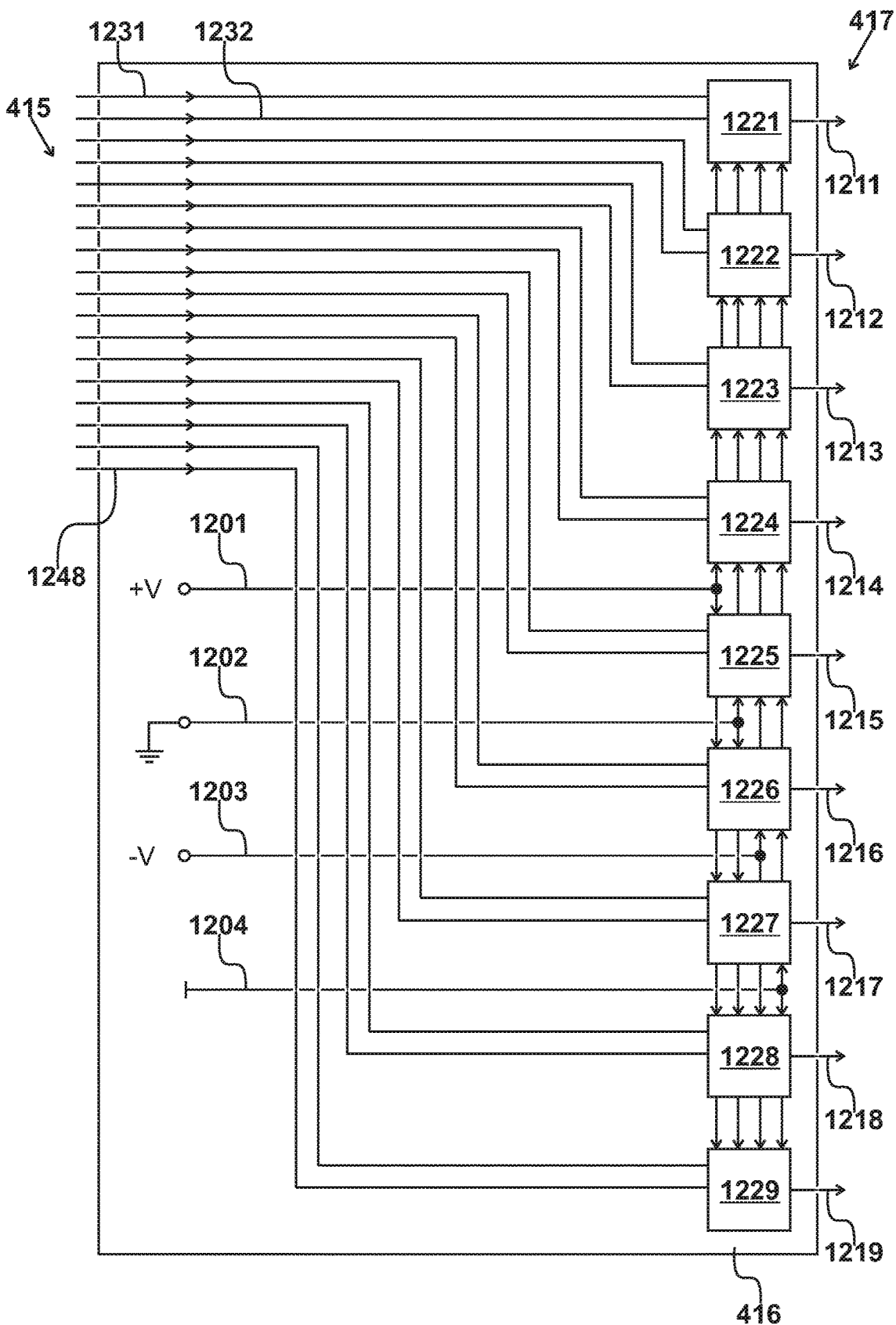
FIG. 12 details a cooperating control circuit.

The cooperating control circuit 416 is shown in FIG. 12, receiving the cooperating address bus 415 and supplying the cooperating attribute lines 417. The cooperating control circuit includes a positive energizing source 1201 for supplying a positive strengthening signal to cooperating electrodes adjacent to an energized active electrode. In addition, a ground connection 1202 is provided for grounding selected cooperating electrodes. For supplying an enhancing signal to selected cooperating electrodes adjacent a monitored active electrode, a negative-energising source 1203 is provided. Finally, a floating connection 1204 is left floating.

The cooperating attributes lines include a respective attribute line 1211 to 1219 for each of the cooperating electrodes 321 to 329 respectively. For each attribute line, a respective cooperating multiplexer 1221 to 1229 is provided, each of which is connected to the positive energising source 1201, the ground connection 1202, the negative energising source 1203 and the floating connection 1204.

The cooperating address bus 415 includes two cooperating address lines for each multiplexer, giving a total of eighteen. Thus, for example, a first-cooperating address line 1231 and a second cooperating address line are arranged to address the first cooperating multiplexer 1211. Thus, each address of two bits allows each cooperating multiplexer to select one of the four attributes 1201 to 1204.

In this embodiment, a positive energization signal is supplied to an active electrode. However, it should be appreciated that a negative signal could be used, in which case the polarities of the enhancing signal and the strengthening signal are reversed.

FIG. 13

Figure 13:
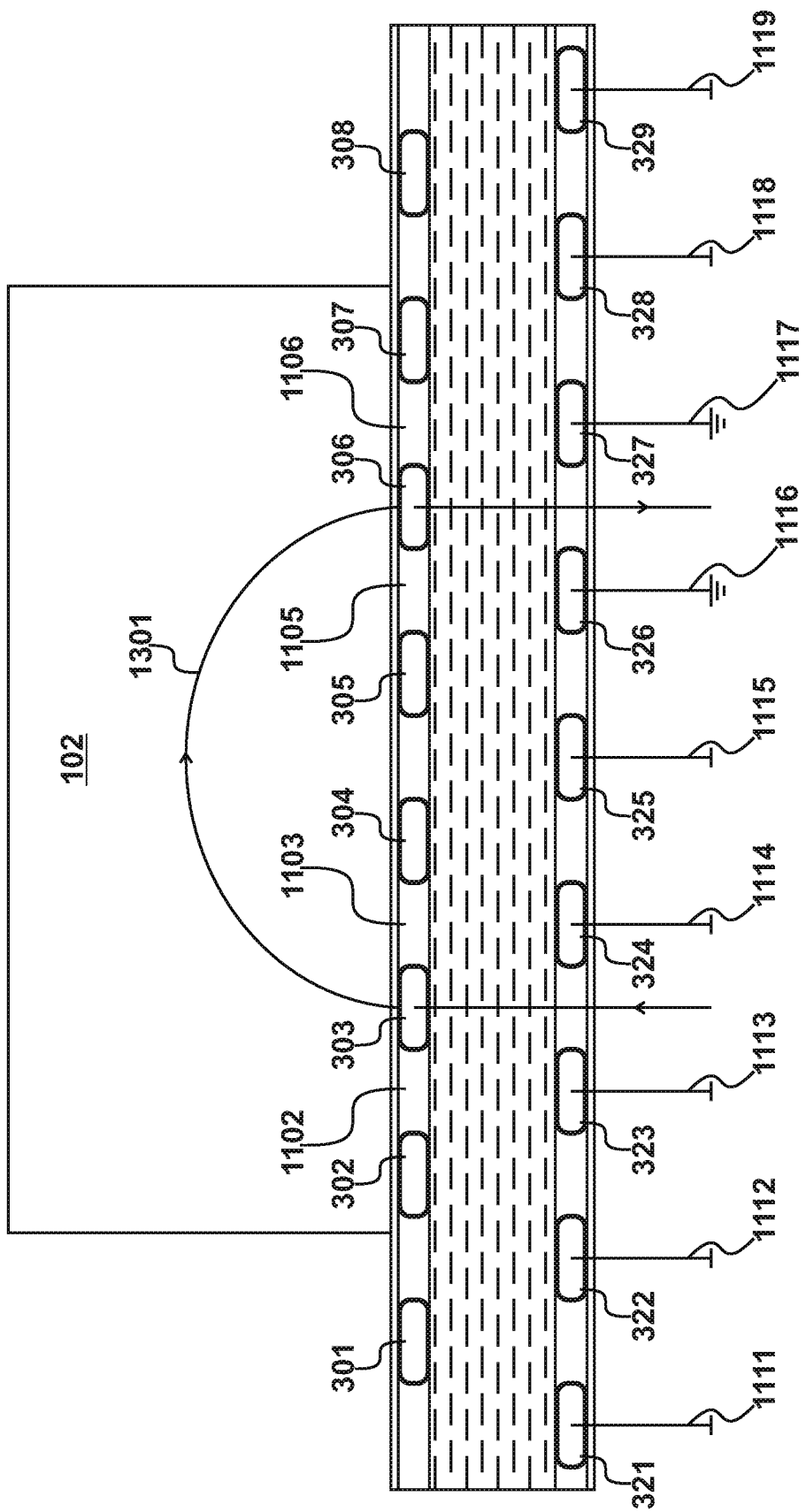
FIG. 13 shows a configuration of electrodes according to a first embodiment.

In the embodiment, of FIG. 13, the third active electrode 303 has been selected to transmit and the sixth active electrode 306 has been selected to receive. Thus, the third active electrode 303 is energized and the sixth active electrode 306 is monitored. This results in the generation of electric field 1301.

The monitored electrode 306 is adjacent to a near gap (the fifth gap 1105) that is closer to an energized electrode (energized electrode 303) than a distant gap (the sixth gap 1106) that is further from the energized transmitter electrode 303. In this embodiment, the processor has been configured to ground a near cooperating electrode (the sixth cooperating electrode 326) that is opposite the near gap (the fifth gap 1105). In addition, the processor is also configured to ground a distant cooperating electrode (the seventh cooperating electrode 327) that is opposite the distant gap 1106.

In this embodiment, the remaining cooperating electrodes 321 to 325 and 328 to 329 are configured to be floating. As a result of this, the near cooperating electrode 326 and the distant cooperating electrode 327 shield the monitored electrode (the sixth active electrode 306). However, given that the remaining cooperating electrodes are floating, they do not provide a transmission path for the electric field 1301, thereby reinforcing the strength of the electric field 1301 and focusing it towards the monitored sixth electrode 306.

For the purposes of illustration, a second embodiment will be described with reference to FIG. 14, a third embodiment will be described with reference to FIG. 15 and a fourth embodiment will be described with reference to FIG. 16. In each of these embodiments, the third-active electrode 303 is energized and the sixth active electrode 306 is monitored. However, it should be appreciated that in an embodiment, any active electrode is available to be energized and any of the remaining active electrodes are available to be monitored.

In an alternative embodiment, the sixth cooperating electrode could float, while the seventh cooperating electrode is grounded.

FIG. 14

Figure 14:
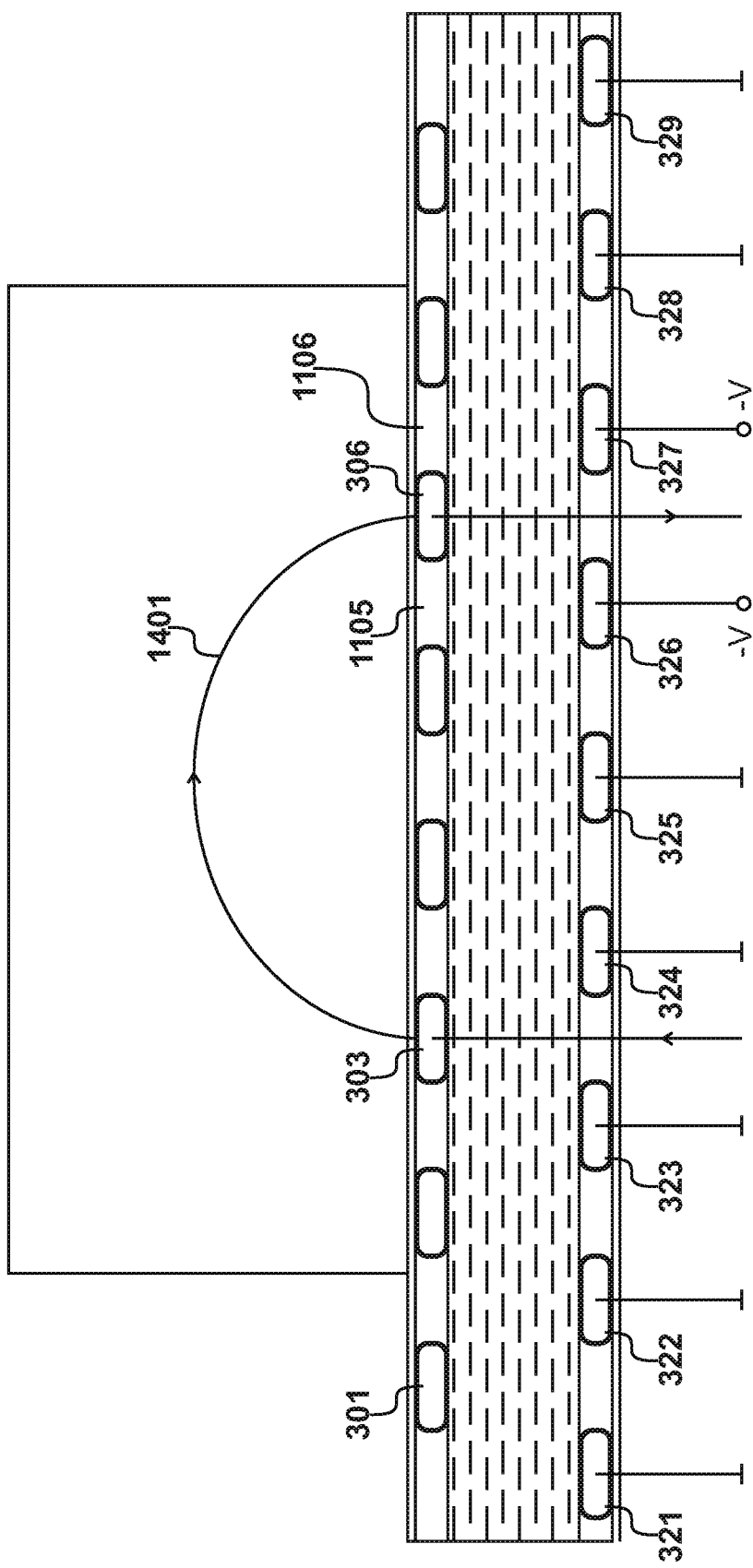
FIG. 14 shows a configuration of electrodes according to a second embodiment.

In the second embodiment shown in FIG. 14, the monitored electrode 306 again may be considered to have a near gap 1105 close to the energized electrode 303 and a far gap 1106 further away from the energized electrode 303. Again, cooperating electrodes 321 to 325 and cooperating electrodes 328 to 329 are configured to be floating and as such do not attract an electric field 1401. It is appreciated, for example, that the first active electrode 301 will experience induced noise, given that the cooperating electrodes 321 and 322 beneath it are floating and as such do not provide grounding protection. However, such a situation is tolerated because the first electrode 301 is not being monitored. Thus, any induced signals appearing on the first electrode 301 are merely ignored.

Protection of this type is provided for the monitored electrode 306 by means of the sixth cooperating electrode 326 and the seventh cooperating electrodes 327, in a manner substantially similar to that described with reference to FIG. 13. However, on this occasion, a first enhancing signal is applied to a near cooperating electrode (the sixth cooperating electrode 326) that is opposite the near gap 1105. In addition, a second enhancing signal is applied to a distant cooperating electrode (the seventh cooperating electrode 327) that is opposite the distant gap, the sixth gap 1106. The first enhancing signal and the second enhancing signal are negative, thereby enhancing the grounding property and further focusing the electric field 1401 towards the monitoring electrode 306. In an embodiment, the first enhancing signal and the second enhancing signal have similar magnitudes. Alternatively, with the provision of additional hardware, the magnitude of the second enhancing signal, applied to the distant cooperating electrode 327 could be larger than the first enhancing signal applied to the near cooperating electrode 326.

In an alternative embodiment, the sixth cooperating electrode 326 could be grounded, while a negative enhancing signal is supplied to the seventh cooperating electrode 327.

FIG. 15

Figure 15:
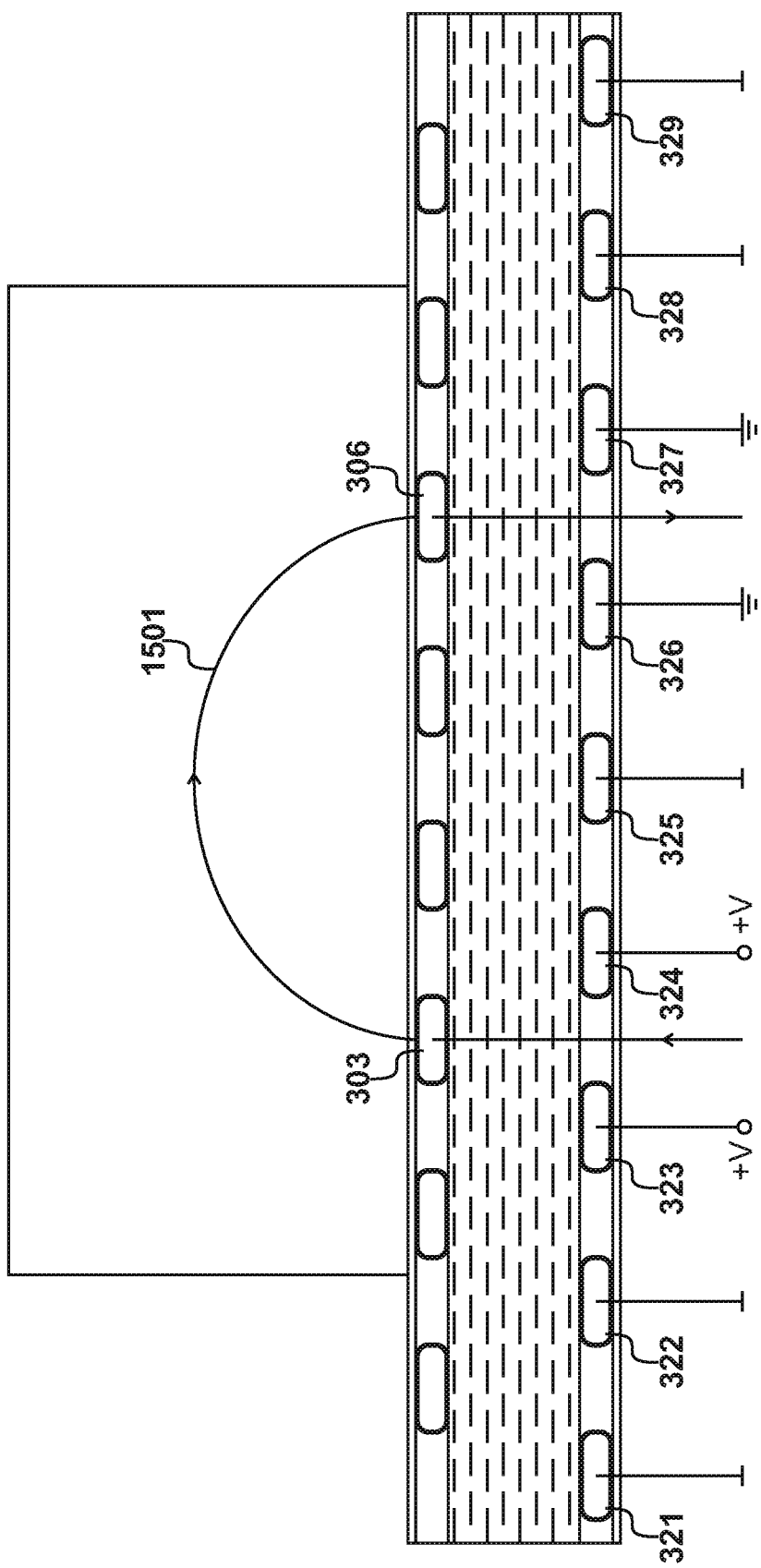
FIG. 15 shows a configuration of electrodes according to a third embodiment.

A third embodiment is illustrated in FIG. 15, having a similar configuration to the first embodiment described with reference to FIG. 13. Again, the third active electrode 303 is energized and the sixth active electrode 306 is monitored. This results in the generation of electric field 1501.

Again, the sixth cooperating electrode 326 and the seventh cooperating electrode 327 are grounded, thereby shielding the monitored electrode 306. However, on this occasion, a strengthening signal is supplied to one or more of the cooperating electrodes at positions close to the energized active electrode 303. In this embodiment, a strengthening signal is supplied to the third cooperating electrode 323 and the fourth cooperating electrodes 324. The strengthening signal is positive, that is to say, the strengthening signal has a similar polarity to the energising signal applied to the energized electrode 303. The focusing of the electric field 1501 is enhanced further and may be considered as being pushed by the attributes of cooperating electrodes 323 and 324, while being pulled by the attributes of cooperating electrodes 326 and 327. In this embodiment, cooperating electrodes 321, 322, 325 328 and 329 are floating.

FIG. 16

The configuration of a fourth embodiment, as shown in FIG. 16, achieves even further focusing of the electric filed 1601. In this embodiment, a negative enhancing signal is supplied to the seventh cooperating electrode 327, to pull the electric field 1601 towards the monitored electrode 306. However, the sixth cooperating electrode 326 is grounded, so as not to deflect the field to much, before it reaches the monitored electrode 306.

In addition, strengthening signals are supplied to the third cooperating electrode 323 and to the fourth cooperating electrode 324. These cooperating electrodes therefore strengthen the electric field 1601 by performing a pushing function in the direction of the transmitter electrode 303.

In the embodiment of FIG. 16, cooperating electrodes 321, 322, 325, 328 and 329 are floating.

What we claim is:

1. An apparatus for examining objects using electric fields to determine properties of said objects, comprising:
    an active plane of active electrodes mounted on a dielectric membrane;
    a processor configured to energize a first active electrode of said active electrodes during a coupling operation, and monitor a second active electrode of said active electrodes during said coupling operation, such that electric fields penetrate said objects and are influenced by properties of said objects when placed on top of said active plane; and
    a cooperating plane of cooperating electrodes, wherein:
        said cooperating plane is displaced from and beneath said active plane; and
        said processor is further configured to apply a first electrical attribute to a first cooperating electrode of said cooperating electrodes and a second electrical attribute to a second cooperating electrode of said cooperating electrodes during said coupling operation.

2. The apparatus of claim 1, wherein said processor is configured to select said first electrical attribute and said second electrical attribute from a list including: grounding, floating and energising.

3. The apparatus of claim 1, comprising a spacer material positioned between said active plane and said cooperating plane.

4. The apparatus of claim 1, wherein said active electrodes define substantially parallel tracks on said active plane, with a gap between each of said tracks.

5. The apparatus of claim 4, wherein:
    said cooperating electrodes define substantially parallel tracks on said cooperating plane; and
    each of said cooperating electrodes is substantially opposite a respective one of said gaps.

6. The apparatus of claim 5, wherein a monitored electrode is adjacent to a first gap close to an energized electrode and adjacent to a second gap further from said energized electrode, wherein said processor is configured to:
- ground said first cooperating electrode opposite said first gap; and
- ground a third cooperating electrode opposite said second gap.

7. The apparatus of claim 5, wherein a monitored electrode has a first gap close to an energized electrode and a second gap further from said energized electrode, wherein said processor is configured to:
- apply a first enhancing signal to said first cooperating electrode opposite said first gap; and
- apply a second enhancing signal to a third cooperating electrode opposite said second gap.

8. The apparatus of claim 5, wherein a monitored electrode has a first gap closer to an energized electrode and a second gap further from said energized electrode, wherein said processor is configured to:
- ground said first cooperating electrode opposite said first gap; and
- apply an enhancing signal to a third cooperating electrode opposite said second gap.

9. The apparatus of claim 6, wherein said processor is configured to allow said cooperating electrodes to float, other than said first cooperating electrode and said third cooperating electrode.

10. The apparatus of claim 1, wherein a strengthening signal is supplied to one or more of said cooperating electrodes at positions close to an energized active electrode.

11. A method of examining objects using electric fields to determine properties of said objects, comprising the steps of:
- energizing a first active electrode of an active plane during a coupling operation;
- monitoring a second active electrode of said active plane during said coupling operation, in response to electric fields that penetrate said object when said object is placed on top of said active plane; and
- selecting and applying electrical attributes for cooperating electrodes of a cooperating plane, wherein:
  - said cooperating plane is displaced from and beneath said active plane;
  - said electrical attributes are selected from a list including grounding, floating and energising; and
  - at least two of said cooperating electrodes have different electrical attributes applied.

12. The method of claim 11, wherein said first active electrode and said second active electrode are included on a dielectric membrane with other active electrodes to define said active plane.

13. The method of claim 12, wherein:
- all of said active electrodes are configured to operate as transmitter electrodes; and
- all of said active electrodes are configured to operate as receiver electrodes, provided that the same active electrode cannot be both energized and monitored during the same coupling operation.

14. The method of claim 11, wherein said first active electrode and second active electrode define substantially parallel tracks on said active plane, with a gap between each of said tracks.

15. The method of claim 14, wherein:
- said cooperating electrodes define substantially parallel tracks on said cooperating plane; and
- each of said cooperating electrodes is substantially opposite a respective one of said gaps.

16. The method of claim 15, further comprising the steps of:
- grounding a first cooperating electrode opposite a first gap; and
- grounding a second cooperating electrode opposite a second gap, wherein:
  - said first gap is adjacent to a monitored electrode close to an energized electrode; and
  - said second gap is adjacent to a monitored electrode further from said energized electrode.

17. The method of claim 15, further comprising the steps of:
- applying a first enhancing signal to a first cooperating electrode opposite a first gap; and
- applying a second enhancing signal to a second cooperating electrode opposite a second gap, wherein:
  - said first gap is adjacent to a monitored electrode close to an energized electrode; and
  - said second gap is adjacent to a monitored electrode further from said energized electrode.

18. The method of claim 17, wherein said second enhancing signal is larger than said first enhancing signal.

19. The method of claim 16, further comprising the step of allowing said cooperating electrodes to float, other than said first cooperating electrode and said second cooperating electrode.

20. The method of claim 11, further comprising the step of applying a strengthening signal to one or more of said cooperating electrodes at positions close to an energized active electrode.

* * * * *